United States Patent
Van Pelt et al.

(10) Patent No.: US 10,179,642 B1
(45) Date of Patent: Jan. 15, 2019

(54) COMPOSITE STRUCTURE WITH INTEGRATED HINGE

(71) Applicant: Kitty Hawk Corporation, Mountain View, CA (US)

(72) Inventors: Chris Van Pelt, Boulder Creek, CA (US); James Joseph Tighe, San Jose, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/629,580

(22) Filed: Jun. 21, 2017

(51) Int. Cl.
| | |
|---|---|
| *B32B 5/26* | (2006.01) |
| *B64C 9/02* | (2006.01) |
| *B32B 5/04* | (2006.01) |
| *B32B 7/02* | (2006.01) |
| *B29C 70/30* | (2006.01) |
| *B64C 9/32* | (2006.01) |
| *B64C 3/20* | (2006.01) |
| *B64C 9/00* | (2006.01) |

(52) U.S. Cl.
CPC ............... *B64C 9/02* (2013.01); *B29C 70/30* (2013.01); *B32B 5/04* (2013.01); *B32B 5/26* (2013.01); *B32B 7/02* (2013.01); *B64C 3/20* (2013.01); *B64C 9/323* (2013.01); *B32B 2250/05* (2013.01); *B32B 2250/20* (2013.01); *B32B 2307/546* (2013.01); *B32B 2313/04* (2013.01); *B32B 2363/00* (2013.01); *B32B 2605/18* (2013.01); *B64C 9/00* (2013.01); *Y10T 428/192* (2015.01)

(58) Field of Classification Search
CPC .............................. Y10T 428/192; B32B 5/26
See application file for complete search history.

(56) References Cited

U.S. PATENT DOCUMENTS

| | | | |
|---|---|---|---|
| 3,445,052 A | 5/1969 | Lewallen | |
| 5,350,614 A * | 9/1994 | Chase | B32B 27/04 428/53 |
| 6,474,945 B1 * | 11/2002 | Nakasato | B64C 27/615 29/889.7 |
| 2002/0000711 A1 | 1/2002 | Schmidt | |
| 2007/0000091 A1 | 1/2007 | Priegelmeir | |
| 2014/0007377 A1 | 1/2014 | Masini | |
| 2015/0040349 A1 | 2/2015 | Malia et al. | |

* cited by examiner

*Primary Examiner* — Alexander S Thomas
(74) *Attorney, Agent, or Firm* — Van Pelt, Yi & James LLP

(57) ABSTRACT

A composite structure with an integrated hinge is disclosed. In various embodiments, the composite structure includes a plurality of layers of fiber reinforced polymer material; and a hinge structure comprising one or more layers of bendably flexible hinge material a first region of which is interleaved between adjacent layers of said layers of fiber reinforced polymer material comprising the composite structure and bonded to said adjacent layers by bonding material comprising said composite structure, and a second region of which extends beyond said layers of fiber reinforced polymer material comprising the composite structure.

9 Claims, 4 Drawing Sheets

COMPOSITE STRUCTURE WITH INTEGRATED HINGE

BACKGROUND OF THE INVENTION

Composite materials, such as carbon fiber reinforced polymer materials, typically are used in applications in which properties of such materials may be advantageous. For example, such materials are strong but lightweight, resulting in their widespread use in fields such as aviation or other lightweight air, ground, or waterborne vehicles.

Typically, composite materials are rigid, which can be an advantage in certain respects but may be a limitation in others. For example, in aviation and other applications, the rigidity of composite materials may make them unsuitable for use in applications that may require a more flexible material and/or one that may be more durable over many cycles of being bent or flexed.

BRIEF DESCRIPTION OF THE DRAWINGS

Various embodiments of the invention are disclosed in the following detailed description and the accompanying drawings.

DETAILED DESCRIPTION

Figure 1:
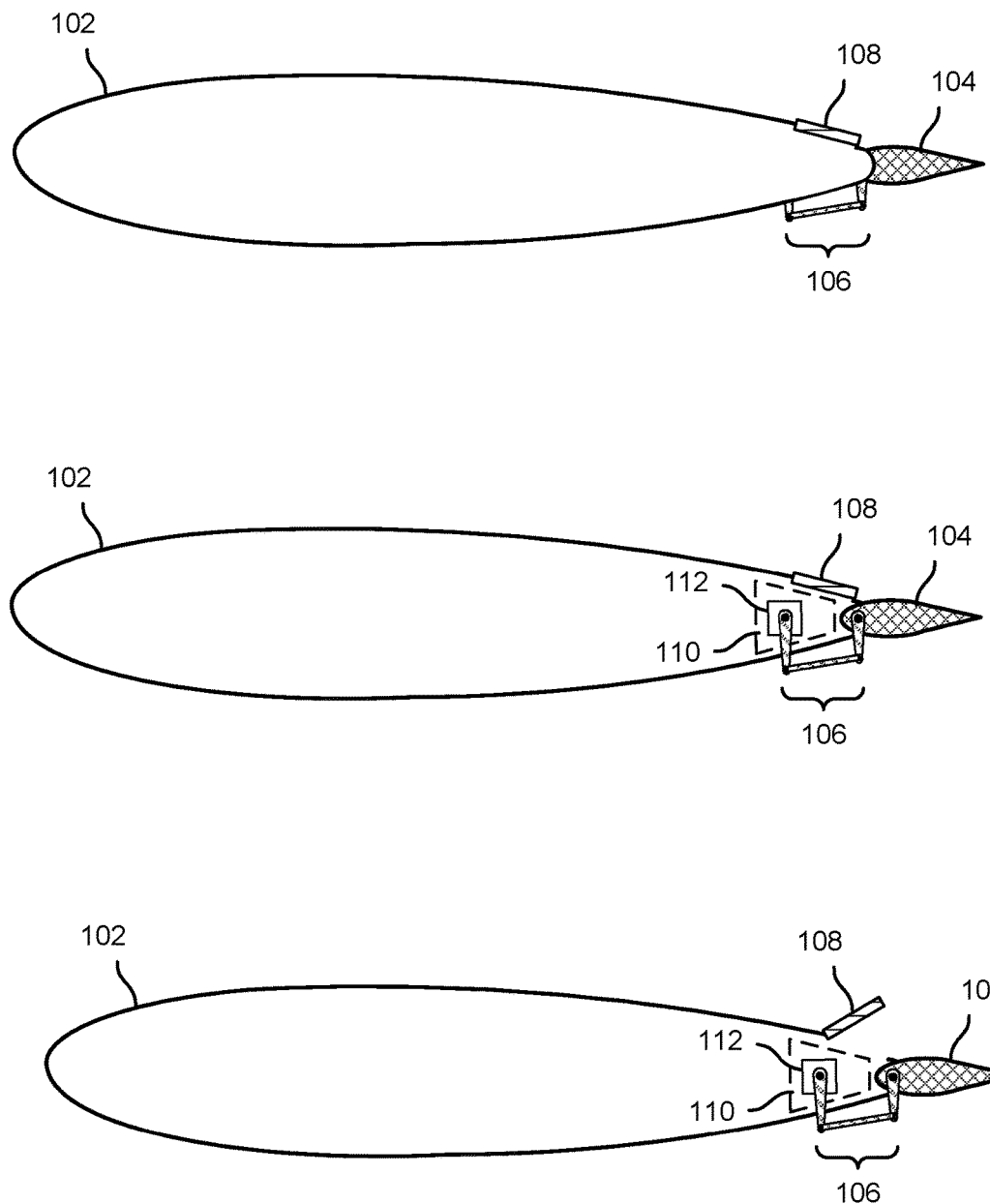
FIG. 1 is a diagram illustrating an embodiment of a composite structure with an integrated hinge.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A composite structure with an integrated hinge comprising one or more layers of high strength synthetic fiber fabric, such as Kevlar® or another aramid material or material with similar properties, is disclosed. In various embodiments, one or more layers of high strength synthetic fiber fabric, such as Kevlar® or another aramid material or material with similar properties, are interleaved with other composite layers in an overlapping manner that results in a composite structure in which a portion of the high strength synthetic fiber fabric is present in a region that joins a first relatively rigid composite component/structure to a second relatively rigid composite component in a flexibly bendable manner. For example, in one application, a composite structure with an integrated hinge as disclosed herein includes an aircraft component, such as a wing, tail, or other aerodynamic structure, in which an integrated hinge as disclosed herein joins an access flap to the aircraft component, enabling access to be gained to structures located under the flap, e.g., by lifting the flap and thereby bending the hinge.

FIG. 1 is a diagram illustrating an embodiment of a composite structure with an integrated hinge. In the example shown, airfoil 102, e.g., an aircraft wing or tail structure, comprises a composite shell formed in the shape of airfoil 102, e.g., using a mold or other tool. In some embodiments, layers of carbon fiber reinforced fabric that has been pre-impregnated with a resin, such as epoxy, commonly referred to as "pre-preg", may be laid out (by hand, robot or other automated machine, etc.) on a mold or other tool in the shape of the desired composite structure, or a portion thereof, and the resulting layering material cured to form a rigid, durable composite structure. In the example shown, airfoil 102 has an aerodynamic control structure 104 at a trailing edge of airfoil 102. Examples of an aerodynamic control structure 104 include without limitation an aileron, elevator, elevon, spoiler, flap, or other structure.

In the example shown, aerodynamic control structure 104 is positioned (e.g., moved up, down, and/or back to a neutral position) via a mechanical linkage 106. The mechanical linkage 106 is driven, in this example, by structures to which access (e.g., for repair) is provided via a hinged flap 108. Specifically, hinged flap 108 provides access to a void 110 in which a servo motor and/or associated power supply and/or control circuits and/or wires or other connectors are located. As shown in the lowermost drawing of FIG. 1, access to void 110 may be gained by lifting up a free end of hinged flap 108, i.e., an end opposite a hinged end by which flap 108 is attached integrally with the composite structure of airfoil 102.

In various embodiments, hinged flap 108 is attached integrally with the composite structure of airfoil 102 by a hinge structure comprising one or more layers of Kevlar® or other aramid or other polymer fabric material having high strength (e.g., tensile strength) and greater flexibility as compared to the composite structure of airfoil 102 itself. For example, in some embodiments, hinged flap 108 may comprise a flap made of the same or similar composition as the composite structure of airfoil 102, and a hinge material comprising one or more layer interleaved with adjacent layers of the composite material comprising airfoil 102. The resulting structure(s) in some embodiments may be compressed (e.g., by vacuum, a press, or other means) and cured to form a combined structure comprising the composite structure of airfoil 102 (e.g., multi-layer carbon fiber reinforced polymer composite), a hinge portion (e.g., one or more layers of Kevlar®), and a flap portion comprising a segment of rigid composite material coupled to the composite structure of airfoil 102 by the hinge portion.

While FIG. 1 shows a hinged access flap on the upper surface of airfoil 102, in some embodiments a hinged structure is instead and/or in addition included on the bottom surface.

Figure 2A:
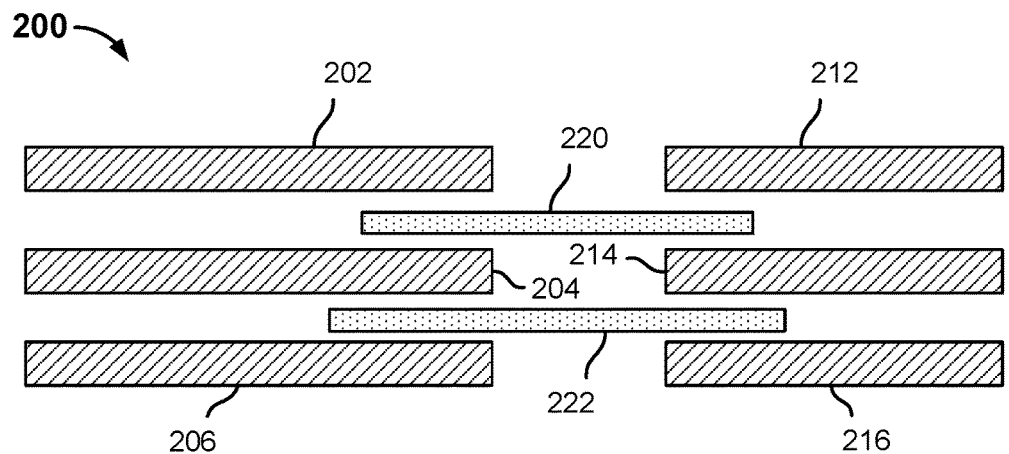
FIG. 2A is a diagram illustrating an embodiment of a composite structure with an integrated hinge.

FIG. 2A is a diagram illustrating an embodiment of a composite structure with an integrated hinge. In the example shown, a composite structure 200 is shown to be formed by interleaving with carbon reinforced polymer fabric (e.g., pre-preg) layers 202, 204, and 206, on one side, and with carbon reinforced polymer fabric (e.g., pre-preg) layers 212, 214, and 216, on the other side, layers of durable, flexible hinge material 220, 222. In some embodiments, hinge material layers 220, 222 comprise Kevlar® or material having properties (e.g., strength, flexibility) similar to Kevlar®.

Figure 2B:
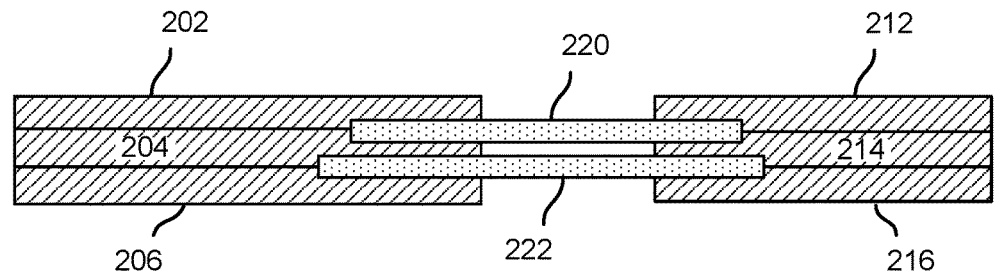
FIG. 2B is a diagram illustrating an embodiment of a composite structure with an integrated hinge.

FIG. 2B is a diagram illustrating an embodiment of a composite structure with an integrated hinge. In the example shown, the materials comprising composite structure 200 of FIG. 2A are shown in a compressed and cured state in which adjacent layers and/or portions thereof have been bonded to one another. In the example shown, bonded and cured composite layers 202, 204, and 206 are shown to form a composite structure, such as may be used in some embodiments to provide a structure such as airfoil 102 of FIG. 1. First ends of hinge materials 220 and 222 are shown to be interleaved between and cured with, and therefore bonded to, adjacent layers 202, 204, and 206. Opposite ends of hinge materials 220 and 222 are shown to be interleaved between and cured with, and therefore bonded to, composite material layers 212, 214, and 216.

In various embodiments, the rightmost end of the composite structure comprising layers 212, 214, and 216 is free, as in the free (trailing) end of hinged flap 108 of FIG. 1.

Figure 2C:
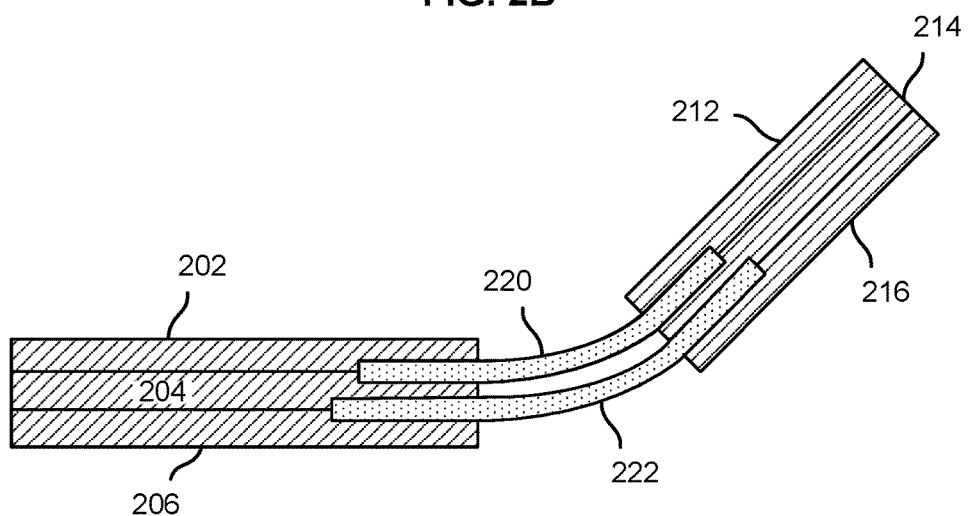
FIG. 2C is a diagram illustrating an embodiment of a composite structure with an integrated hinge.

FIG. 2C is a diagram illustrating an embodiment of a composite structure with an integrated hinge. In the position shown in FIG. 2C, the free end of the (hinged flap) composite structure comprising layers 212, 214, and 216 has been lifted upwards (as shown) by bending/flexing the hinge material 220, 222. In some embodiments, the hinge material 220, 222 would tend to return to its original, unbent state, such that release of the composite structure comprising layers 212, 214, and 216 would result in the hinge material 220, 222 unbending and the composite structure comprising layers 212, 214, and 216 returning to the position shown in FIG. 2B.

In some embodiments, the hinge material 220, 222 comprises two layers of prepreg Kevlar, e.g., 0.004 in thick layers, both oriented in the 0°/90° direction. In some embodiments, hinge material 220 and hinge material 222 overlap by a minimum of ½ inch (total) with the ends not superimposed on top of one another, e.g., in some embodiments they are staggered by ¼ inch or so on each side as shown.

Figure 3:
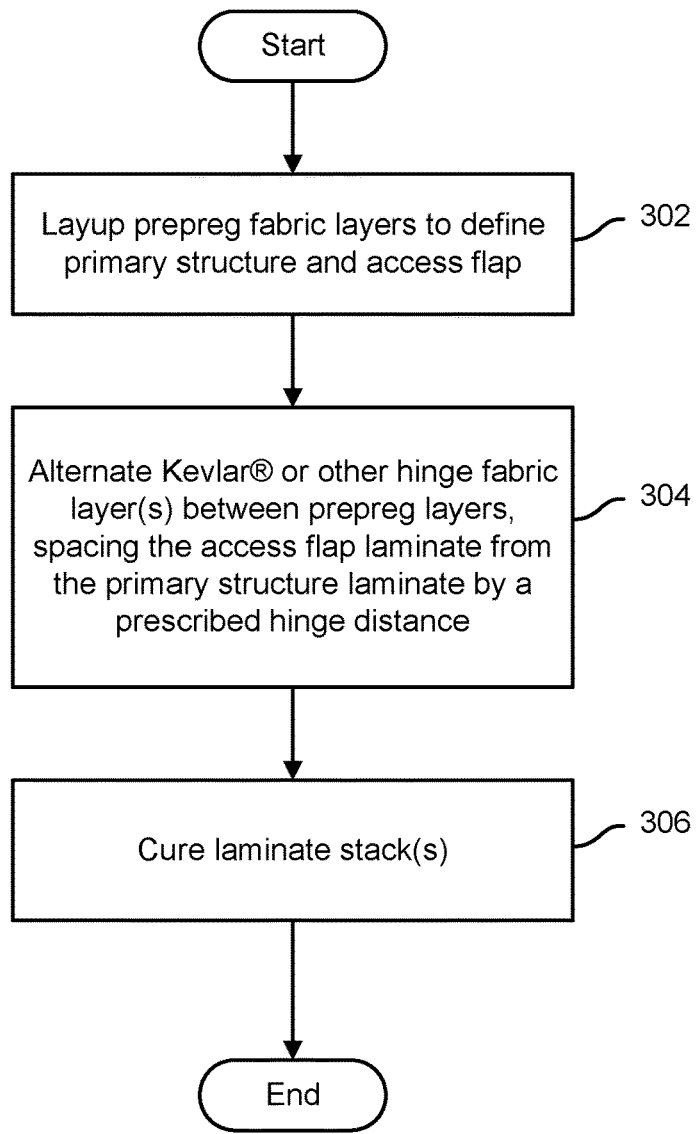
FIG. 3 is a flow chart illustrating an embodiment of a process to fabricate a composite structure with an integrated hinge.

FIG. 3 is a flow chart illustrating an embodiment of a process to fabricate a composite structure with an integrated hinge. In various embodiments, the process of FIG. 3 may be used to form a composite structure with an integrated hinge, such as one or more of airfoil 102 and hinged flap 108 of FIG. 1 and/or the composite structure 200 of FIGS. 2A-2C. In the example shown, prepreg fabric layers are laid up, e.g., in one or more molds, forms, or other tools, to (begin to) define a primary structure (e.g., airfoil 102 of FIG. 1) and an access flap (e.g., rigid composite flap 108 of FIG. 1) (302). For example, prepreg layers may be laid up on opposite sides of a single mold or in separate molds in adjacent positions, e.g., on a work bench or other surface. The composite layers of the primary structure, on the one hand, and the access flap (or other secondary structure) on the other hand may be spaced apart by a distance associated with an exposed portion of a hinge to be formed between the primary and secondary composite structures. The exposed portion of the hinge may mechanically couple the primary structure to the secondary structure (e.g., access flap), enabling the second structure to be manipulated in the finished product by bending the exposed portion of the hinge.

Note that while the term "primary" and "secondary" are sometimes used herein to refer to composite structured joined by an integrated hinge as disclosed herein, in various embodiments any "first" and "second" composite structures may be connected by an integrated hinge as disclosed herein.

In nearly adjacent regions of the primary structure, on the one hand, and the access flap or other secondary structure, on the other, layers of Kevlar® or other flexible hinged materials are interleaved with adjacent layers of prepreg (or other rigid composite precursor material) (304). For example, segments of Kevlar® may be laid across opposite edges of the lower layer stack of the primary and secondary composite structures, and alternating layers in between, followed by one or more upper layers of prepreg.

The laminate stacks, including the interleaved hinge materials, are cured (306). For example, pressure may be applied to compress the stacked layers of material, and the combined mass heated to cure the resin in the prepreg, resulting in a composite structure comprising an integrated flexible hinge, the hinge comprising hinge material interleaved with and bonded at each end with alternating layers of composite material.

Figure 4:
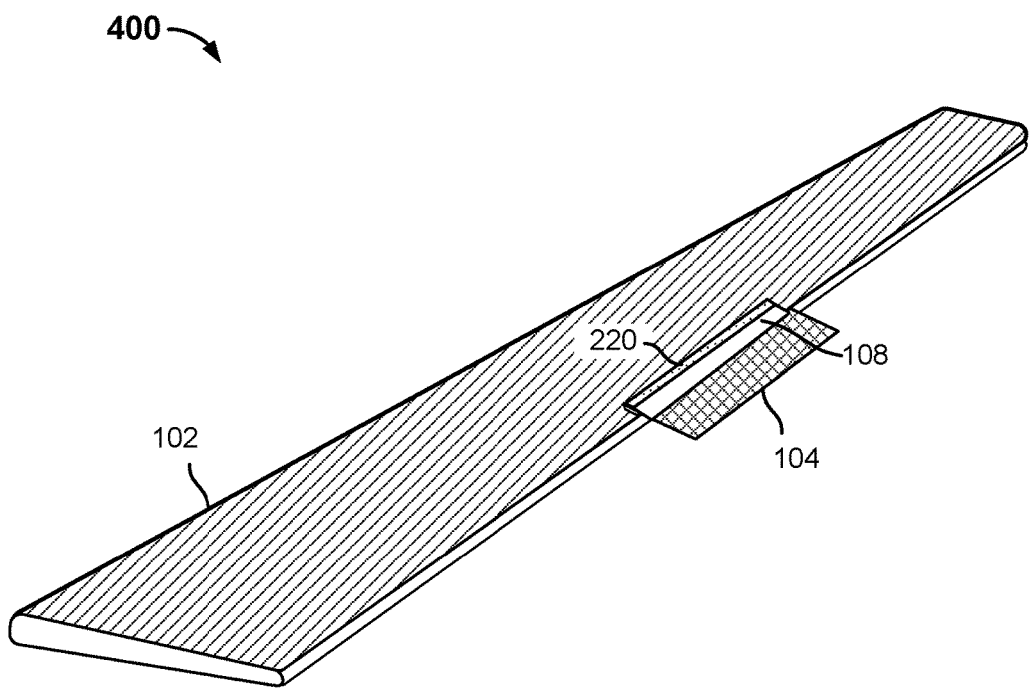
FIG. 4 is a diagram illustrating an embodiment of a composite structure with an integrated hinge.

FIG. 4 is a diagram illustrating an embodiment of a composite structure with an integrated hinge. In the example shown, airfoil 102 of FIG. 1 is shown in perspective view 400 to comprise a wing or other aerodynamic structure having a control surface 104 positioned along a portion of the trailing edge of the airfoil 102. Hinged flap 108 is shown to overlap a forward edge of the control surface 104 at a free end of hinged flap 108 and to be flexibly coupled to and integrated with airfoil 102 by a hinge material 220, such as Kevlar®. In various embodiments, the hinged flap 108 may be lifted at its free end, which results in the hinge material 220 bending and access being gained to a void or other region below hinged flap 108, such as the linkage 106 and/or servo motor 112 of FIG. 1.

In various embodiments, a composite structure with an integrated hinge, as disclosed herein, may be used to provide a hinged access flap or other structure having a durable, flexible hinged attachment to and integration with a primary composite structure. In various embodiments, integrating the hinge material into the composite layer stack, as disclosed herein, may enable the hinge to be integrated with the composite structure in a secure manner without requiring additional adhesives or mounting hardware. The resulting structure may have minimal drag and lower complexity and/or failure modes as compared to other solutions to provide an access flap or other hinged connection between composite parts.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A composite structure, comprising:
   a first composite structure comprising a plurality of layers of fiber reinforced polymer material;
   a second composite structure comprising a plurality of layers of fiber reinforced polymer material;
   a hinge structure comprising two or more layers of bendably flexible hinge material, a first region of each of the two or more layers of which is interleaved between and cured with adjacent layers of said layers of fiber reinforced polymer material comprising the first composite structure and bonded to said adjacent layers by bonding material comprising said first composite structure, a second region of each of the two or more layers of which extends beyond said layers of fiber reinforced polymer material comprising the first composite structure, and a third region of each of the two or more layers of which is interleaved between and cured with adjacent layers of said layers of fiber reinforced polymer material comprising the second composite structure and bonded to said adjacent layers by bonding material comprising said second composite structure; and
   wherein the interleaving of each of the two or more layers of bendably flexible hinge material in the hinge structure with layers of the first composite structure in the first region and layers of the second composite structure in the third region forms a laminate stack of alternating layers of the hinge material and the fiber reinforced polymer material, and the hinge structure includes an air gap between at least two of the two or more layers of bendably flexible hinge material.

2. The composite structure of claim 1, wherein the hinge structure is bendable.

3. The composite structure of claim 1, wherein the hinge structure comprises one or more of Kevlar® and another aramid.

4. The composite structure of claim 1, wherein the hinge structure comprises a material having lower rigidity than the composite structure.

5. The composite structure of claim 1, wherein layers of fiber reinforced polymer comprise carbon fiber reinforced polymer.

6. The composite structure of claim 1, wherein said bonding material comprises a cured resin.

7. The composite structure of claim 1, wherein said bonding material comprises epoxy.

8. The composite structure of claim 1, wherein the second composite structure comprises a flap structure having a free end opposite the hinge material.

9. The composite structure of claim 1, wherein the number of hinge material layers is fewer than the number of layers of the first composite structure.

* * * * *